US009624787B2

(12) United States Patent
Wigen

(10) Patent No.: US 9,624,787 B2
(45) Date of Patent: Apr. 18, 2017

(54) TOTAL AIR TEMPERATURE SENSORS

(71) Applicant: Rosemount Aerospace Inc., Burnsville, MN (US)

(72) Inventor: Scott Wigen, Lakeville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 518 days.

(21) Appl. No.: 14/178,351

(22) Filed: Feb. 12, 2014

(65) Prior Publication Data

US 2015/0093244 A1  Apr. 2, 2015

Related U.S. Application Data

(60) Provisional application No. 61/884,673, filed on Sep. 30, 2013.

(51) Int. Cl.
*F01D 25/02* (2006.01)
*G01K 13/02* (2006.01)
*F01D 21/00* (2006.01)

(52) U.S. Cl.
CPC ........... *F01D 25/02* (2013.01); *F01D 21/003* (2013.01); *G01K 13/028* (2013.01)

(58) Field of Classification Search
CPC ...... F01D 25/02; F01D 21/003; G01K 13/028
See application file for complete search history.

(56) References Cited

U.S. PATENT DOCUMENTS

| 3,348,414 | A | * | 10/1967 | Waters | F01D 17/085 374/115 |
| 3,512,414 | A | * | 5/1970 | Rees | G01K 13/02 244/134 R |
| 4,244,222 | A | | 1/1981 | Hoyer et al. | |
| 4,595,298 | A | | 6/1986 | Frederick | |
| 4,765,751 | A | | 8/1988 | Pannone et al. | |
| 7,357,572 | B2 | * | 4/2008 | Benning | G01K 13/02 374/138 |

(Continued)

FOREIGN PATENT DOCUMENTS

EP   0111785 A1 *  6/1984  ............... B64C 3/14
EP   2607872 A2     6/2013

(Continued)

OTHER PUBLICATIONS

Extended European Search Report dated Feb. 13, 2015, issued on corresponding European Patent Application No. 14186686.3.

*Primary Examiner* — Jacob Cigna
(74) *Attorney, Agent, or Firm* — Locke Lord LLP; Scott D. Wofsy; Alicia J. Carroll

(57) ABSTRACT

A total air temperature sensor includes an airfoil body extending from an airfoil base to an opposed airfoil tip along a longitudinal axis. The airfoil body defines a leading edge and opposed trailing edge. The airfoil body defines an interior flow passage with an inlet for fluid communication of fluid into the interior flow passage and an outlet for exhausting fluid out from the interior flow passage, and wherein the airfoil body defines a bleed passage through the airfoil body between the leading edge and the interior flow passage. A temperature probe is mounted within the interior flow passage for measuring temperature of flow through the interior flow passage to determine total air temperature.

15 Claims, 4 Drawing Sheets

(56) References Cited

U.S. PATENT DOCUMENTS

| | | | |
|---|---|---|---|
| 7,845,222 B1* | 12/2010 | Goedel | G01D 5/30 |
| | | | 73/170.02 |
| 2013/0022076 A1* | 1/2013 | Dijon | G01K 13/028 |
| | | | 374/138 |
| 2013/0163636 A1 | 6/2013 | Parsons | |
| 2015/0110154 A1* | 4/2015 | Gmach | G01K 13/028 |
| | | | 374/144 |
| 2015/0114006 A1* | 4/2015 | Tan | F02C 7/20 |
| | | | 60/797 |

FOREIGN PATENT DOCUMENTS

| | | | | |
|---|---|---|---|---|
| GB | 1029522 A | * | 5/1966 | G01K 13/02 |
| WO | WO-94/25842 A1 | | 11/1994 | |

* cited by examiner

TOTAL AIR TEMPERATURE SENSORS

CROSS-REFERENCE TO RELATED APPLICATIONS

This application claims the benefit of priority to U.S. Provisional Patent Application No. 61/884,673 filed Sep. 30, 2013 which is incorporated by reference herein in its entirety.

BACKGROUND OF THE INVENTION

1. Field of the Invention

The present disclosure relates to temperature sensors, and more particularly to total air temperature sensors, such as used in aerospace applications.

2. Description of Related Art

Modern jet powered aircraft require very accurate measurement of outside air temperature for inputs to the air data computer, engine thrust management computer, and other airborne systems. For these aircraft types, their associated flight conditions, and the use of total air temperature probes in general, air temperature is better defined by the following four temperatures: (1) Static air temperature (SAT) or (TS), (2) total air temperature (TAT) or (Tt), (3) recovery temperature (Tr), and (4) measured temperature (Tm). Static air temperature (SAT) or (TS) is the temperature of the undisturbed air through which the aircraft is about to fly. Total air temperature (TAT) or (Tt) is the maximum air temperature that can be attained by 100% conversion of the kinetic energy of the flow. The measurement of TAT is derived from the recovery temperature (Tr), which is the adiabatic value of local air temperature on each portion of the aircraft surface due to incomplete recovery of the kinetic energy. Recovery temperature (Tr) is obtained from the measured temperature (Tm), which is the actual temperature as measured, and which can differ from recovery temperature because of heat transfer effects due to imposed environments.

Total air temperature sensors used at the inlets of gas turbine engines, for example, can use airfoil shaped members with slots positioned so the gas stream to be sensed passes through one of the slots, and the temperature sensor element is mounted in the slot. Examples of such systems are disclosed in U.S. Pat. No. 3,512,414 which is incorporated by reference herein in its entirety. Such sensor designs can mitigate the effects of high velocity foreign objects being ingested by the engine, and can include provisions for deicing.

One ongoing challenge for total air temperature measurements is associated with operation at higher Mach numbers. Compressibility effects occurring at higher Mach numbers can alter the desired flow pattern through traditional sensors, with potential reduction in response time, for example if there is reduced flow bathing the actual sensor element.

Another phenomenon which presents difficulties to some conventional TAT probe designs has to do with the problem of boundary layer separation, or "spillage," at low mass flows. Flow separation creates two problems for the accurate measurement of TAT. The first has to do with turbulence and the creation of irrecoverable losses that reduce the measured value of TAT. The second is tied to the necessity of having to heat the probe in order to prevent ice formation during icing conditions. Anti-icing performance is facilitated by heater elements embedded in the housing walls. Unfortunately, external heating also heats the internal boundary layers of air which, if not properly controlled, provides an extraneous heat source in the measurement of TAT. This type of error, commonly referred to as deicing heater error (DHE), is difficult to correct for.

Such conventional methods and systems have generally been considered satisfactory for their intended purpose. However, there is still a need in the art for systems and methods that allow for improved total air temperature sensor performance, including improved time response at elevated Mach numbers. There also remains a need in the art for such systems and methods that are easy to make and use. The present disclosure provides a solution for these problems.

SUMMARY OF THE INVENTION

A total air temperature sensor includes an airfoil body extending from an airfoil base to an opposed airfoil tip along a longitudinal axis. The airfoil body defines a leading edge and opposed trailing edge. The airfoil body defines an interior flow passage with an inlet for fluid communication of fluid into the interior flow passage and an outlet for exhausting fluid out from the interior flow passage, and wherein the airfoil body defines a bleed passage through the airfoil body between the leading edge and the interior flow passage. A temperature probe is mounted within the interior flow passage for measuring temperature of flow through the interior flow passage to determine total air temperature.

In certain embodiments, the airfoil body defines a high pressure surface and an opposed low pressure surface each extending longitudinally from the airfoil base to the airfoil tip. Each of the high and low pressure surfaces extends downstream from the leading edge to the trailing edge of the airfoil body. The inlet of the interior flow passage can be defined in the high pressure surface. The bleed passage can have an inlet in the high pressure surface between the leading edge and the inlet of the interior flow passage. The outlet of the interior flow passage can be defined in the low pressure surface. The bleed passage can have an outlet in the low pressure surface between the leading edge and the outlet of the interior flow passage.

It is contemplated that in certain embodiments, the inlet of the interior flow passage defines an elongate aperture extending axially along an exterior longitudinal surface of the airfoil body. The outlet of the interior flow passage can define an elongate aperture extending axially along an exterior longitudinal surface of the airfoil body. The bleed passage can be cylindrical.

A heater can be disposed upstream of the bleed passage for discouraging ice buildup on the airfoil body. A radiation shield can be disposed partially about the temperature probe within the interior flow passage for inhibiting radiative heat exchange between the airfoil body and the temperature probe. The airfoil body can define a supercritical airfoil with a characteristic normal shock location downstream of the inlet and outlet of the interior flow passage.

It is contemplated that there can be a plurality of outlets for exhausting fluid out from the interior flow passage, and a plurality of bleed passages through the airfoil body between the leading edge and the interior flow passage. In such embodiments, each bleed passage can have an inlet in the high pressure surface between the leading edge and the inlet of the interior flow passage. The outlets of the interior flow passage can be defined in the low pressure surface. The bleed passages can each have a respective outlet in the low pressure surface between the leading edge and the outlets of the interior flow passage, and each bleed passage can be cylindrical.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
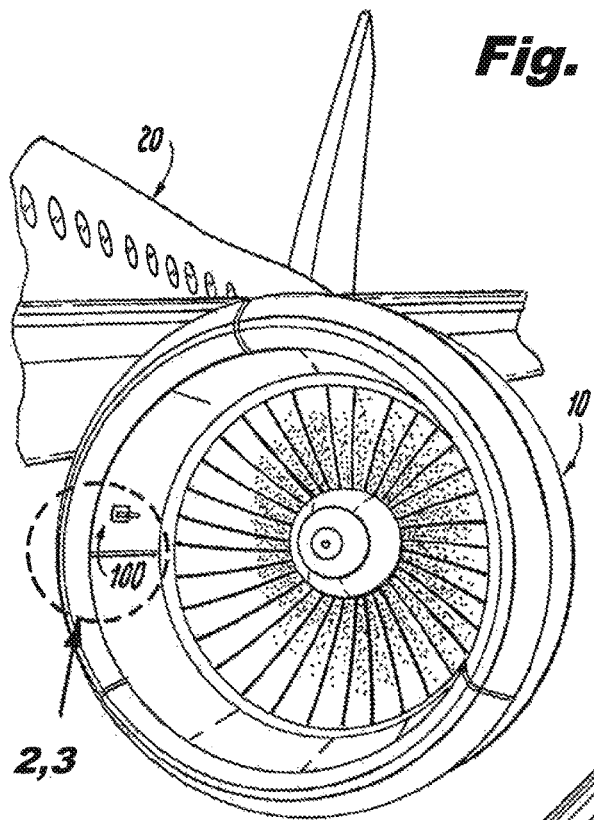
FIG. 1 is a perspective view of an exemplary embodiment of a total air temperature sensor constructed in accordance with the present disclosure, showing the sensor mounted to the inlet of a gas turbine engine.

Reference will now be made to the drawings wherein like reference numerals identify similar structural features or aspects of the subject disclosure. For purposes of explanation and illustration, and not limitation, a partial view of an exemplary embodiment of a total air temperature sensor in accordance with the disclosure is shown in FIG. 1 and is designated generally by reference character 100. Other embodiments of total air temperature sensors in accordance with the disclosure, or aspects thereof, are provided in FIGS. 2-7, as will be described. The systems and methods described herein can be used for total air temperature measurements, for example in aerospace applications.

As shown in FIG. 1, total air temperature sensor 100 can be mounted in the inlet of a gas turbine engine 10 on an aircraft 20, for example. Those skilled in the art will readily appreciate that this application is exemplary only, and that sensors in accordance with this disclosure can be used in any other suitable position on an aircraft or in any other suitable application without departing from the scope of this disclosure.

Figure 2:
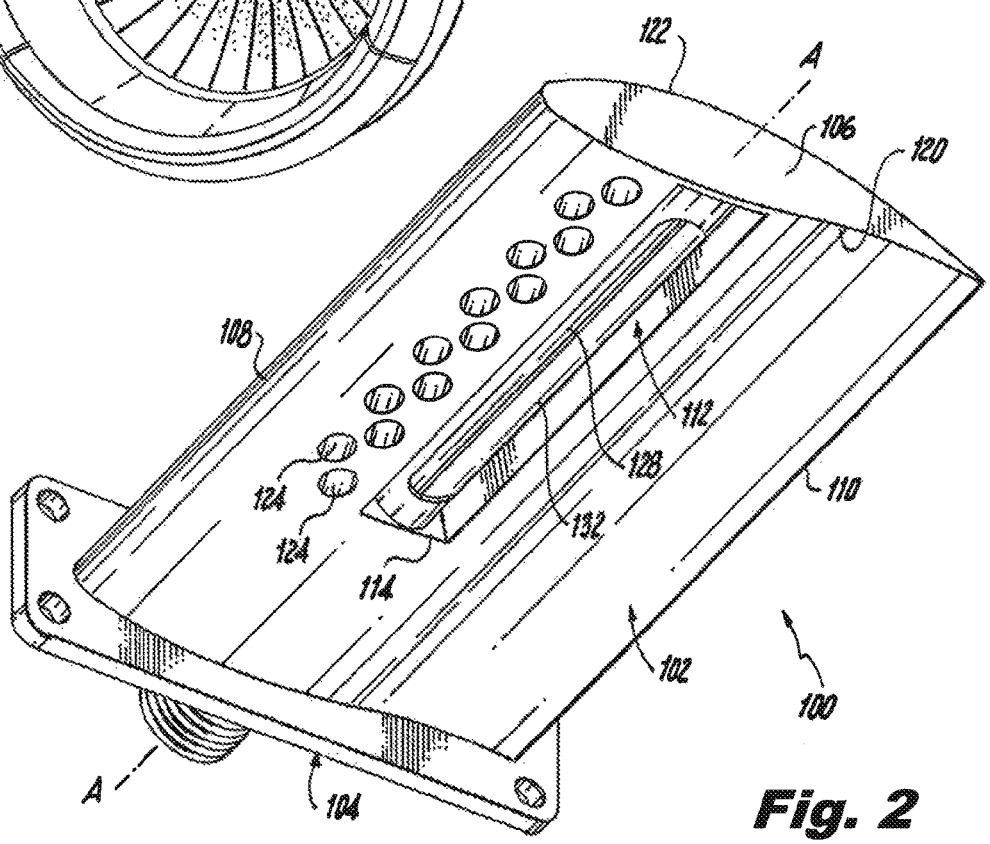
FIG. 2 is a perspective view of the total air temperature sensor of FIG. 1, showing the bleed passage inlets and the temperature probe within the radiation shield, viewed through the inlet into the interior flow passage.

Referring now to FIG. 2, total air temperature sensor 100 includes an airfoil body 102 extending from an airfoil base 104 to an opposed airfoil tip 106 along a longitudinal axis A. Airfoil body 102 defines a leading edge 108 and opposed trailing edge 110. Airfoil body 102 is depicted as defining a supercritical airfoil, however those skilled in the art will readily appreciate that any other airfoil of cross-sectional profile can be used without departing from the scope of this disclosure.

Figure 3:
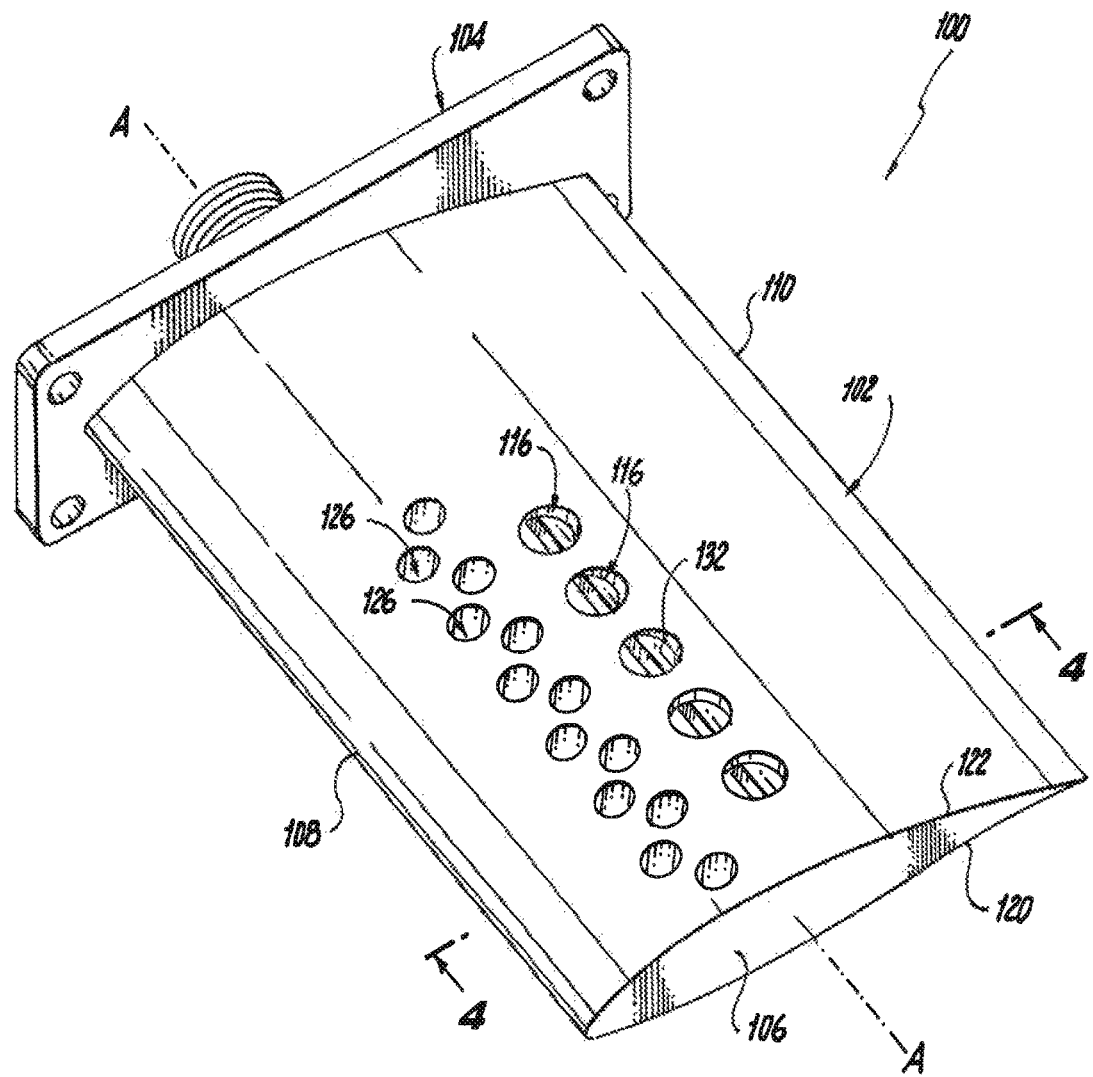
FIG. 3 is a perspective view of the total air temperature sensor of FIG. 1, showing the outlets of the bleed passages and the outlets of the interior flow passage.

Referring to FIGS. 2-3, airfoil body 102 defines a high pressure surface 120 and an opposed low pressure surface 122 each extending longitudinally from airfoil base 104 to airfoil tip 106. Each of the high and low pressure surfaces 120 and 122 extends downstream from leading edge 108 to trailing edge 110.

Airfoil body 102 defines an interior flow passage 112 with an inlet 114 for fluid communication of fluid into interior flow passage 112. Inlet 114 of interior flow passage 112 is defined in high pressure surface 120. Inlet 114 defines an elongate aperture extending axially along an exterior longitudinal surface of airfoil body 102 relative to longitudinal axis A. As shown in FIG. 3, a plurality of outlets 116 are defined in low pressure surface 122 of airfoil body 102 for exhausting fluid out from interior flow passage 112. The supercritical airfoil profile of airfoil body 102 can be configured so that the characteristic normal shock location is downstream of inlet 114 and outlets 116 to provide reliable flow through interior flow passage 112 even at Mach numbers high enough to form a normal shock. While interior flow passage 112 is shown and described as having multiple outlets 116, it is also contemplated that the outlet of interior flow passage 112 can define a single elongate aperture extending axially along an exterior longitudinal surface of the airfoil body, much like inlet 114.

Figure 4:
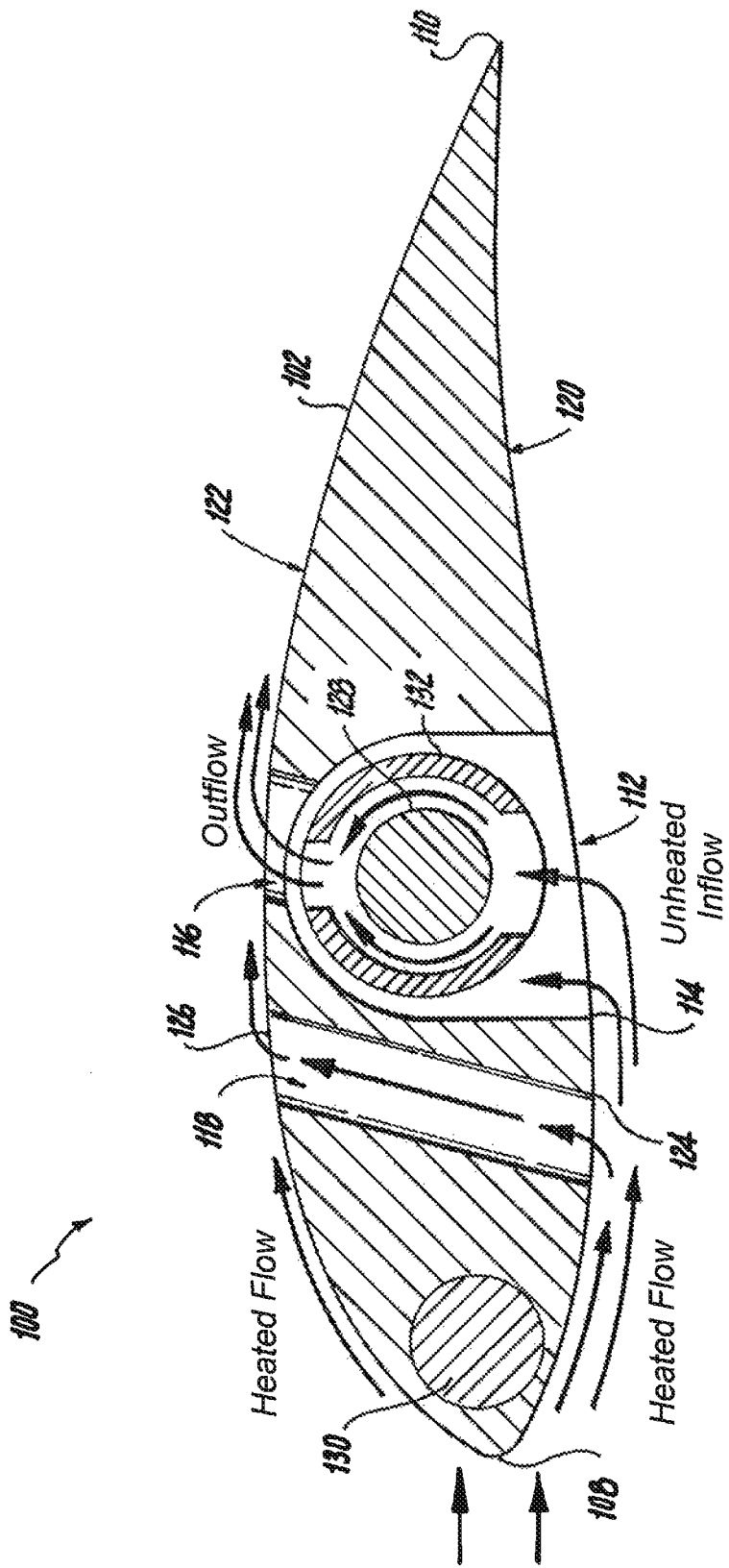
FIG. 4 is a cross-sectional end elevation view of the total air temperature sensor of FIG. 1, showing the heater upstream of the bleed passages.

As shown in FIG. 4, airfoil body 102 also defines a plurality of cylindrical bleed passages 118 through airfoil body 102 between leading edge 108 and interior flow passage 112. Each bleed passage 118 has an inlet 124 in high pressure surface 120 between leading edge 108 and inlet 114 of interior flow passage 112. Inlets 124 of the bleed passages 118 are also shown in FIG. 2 where for sake of clarity not all of the inlets 124 are labeled with a reference character. As shown in FIGS. 3 and 4, each of the bleed passages 118 has an outlet 126 in low pressure surface 122 between leading edge 108 and the outlets 116 of interior flow passage 112. For sake of clarity, not all of the outlets 126 of the bleed passages 118 are labeled with a reference character in FIG. 3.

Referring still to FIG. 4, a temperature probe 128, e.g., a resistive temperature device or any other suitable type of temperature probe, is mounted within interior flow passage 112 for measuring the temperature of fluid flowing through interior flow passage 112 to determine total air temperature. A heater 130 is disposed, e.g., a cartridge embedded in airfoil body 102, upstream of bleed passages 118 for discouraging ice buildup on airfoil body 102. A radiation shield 132 is disposed partially about temperature probe 128 within interior flow passage 112 for inhibiting radiative heat exchange between airfoil body 102 and temperature probe 128. Radiation shield 132 has an inlet and an opposed outlet corresponding to the inlet and outlets 114 and 116. It is contemplated that radiation shield 132 can also act as a flow control tube. Those skilled in the art will readily appreciate that the ratio between the inlet and the outlet of radiation shield 132 can be adjusted to change performance parameters, such as, time response and recovery error. As indicated schematically in FIG. 4, airflow passing over leading edge 108 is heated by heater 130 to discourage or prevent ice buildup along leading edge 108. The heated boundary layer is effectively sucked into bleed passages 118 upstream of inlet 114 of interior flow passage 112. This prevents heated air from encountering temperature probe 128, where it could otherwise cause deicing heater error (DHE). The air flowing into interior flow passage 112, around temperature probe 128, and out outlets 116 is indicative of the ambient air.

Figure 5:
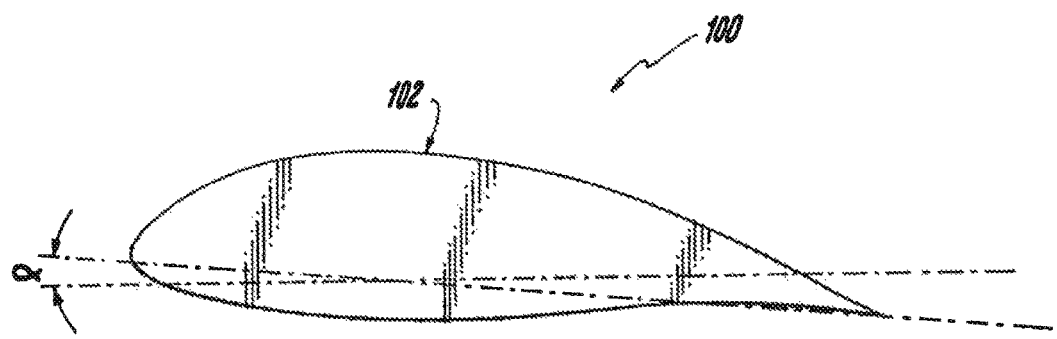
FIG. 5 is a schematic end elevation view of the total air temperature sensor of FIG. 1, showing the angle of attack of the airfoil body.

It is contemplated that sensor 100 can be mounted with airfoil body 102 having a small, positive angle of attack to help ensure differential pressure is maintained from the high and low pressure surfaces 120 and 122 throughout flight angle of attack variation to maintain a high flow over temperature probe 128. Ample flow over temperature probe 128 provides good time-response for total air temperature measurements. For example, FIG. 5 schematically shows airfoil body 102 having a 5° angle of attack α. Those skilled in the art will readily appreciate that any other suitable angle of attack can be used without departing from the scope of this disclosure.

The airfoil shape of airfoil body 102 can be configured with deicing power requirements in mind on an application by application basis. Droplets tend to flow around the airfoil shape. Typically, droplets only impact the front one-quarter of the chord and that is typically where the heat is needed to prevent icing. A heating cartridge, e.g., heater 130 described above, or a surface heater can be used in this leading portion of the chord. Other application-specific considerations include run back icing and the corresponding impact on performance. In choosing an appropriate airfoil shape for a given application, generally a larger pressure differential is better for response time. A thicker airfoil is generally better to help maintain a short chord. Those skilled in the art will readily appreciate that a short cord can be beneficial because it requires a smaller penetration hole through the aircraft engine nacelle, for example. It is also beneficial to configure the airfoil body, interior flow passage, and its inlets and outlets to keep the temperature probe safe from particle impingement over the sensor's operational angle of attack range.

Figure 6:
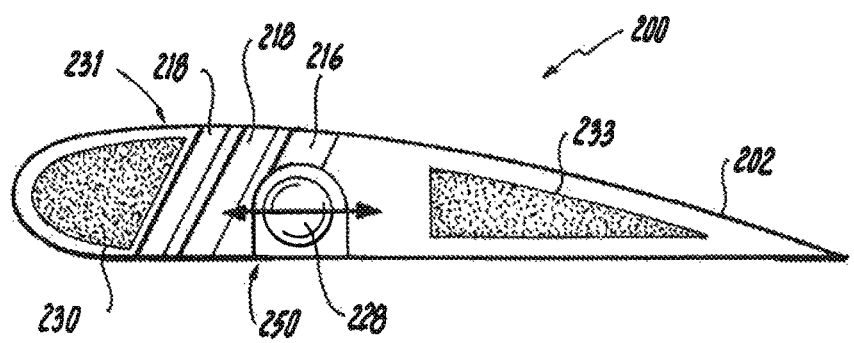
FIG. 6 is a schematic end view of another exemplary embodiment of a total air temperature sensor constructed in accordance with the present disclosure, showing fore and aft heaters within the airfoil body.

With these design principles, sensors in accordance with this disclosure can be tailored for specific applications. Referring to FIG. 6, another exemplary embodiment of a total air temperature sensor 200 is shown. Sensor 200 is similar in many aspects to sensor 100 described above. Heater 230 has an increased cross-sectional area relative to heater 130 described above. Heater 230 is aspirated using hot air, with outlets 231 in the low pressure side of airfoil body 202. There is an extra row of bleed passages 218, for a total of three, compared to two rows in sensor 100 described above. Finally, a heater 233 is added to the trailing portion of airfoil body 202 to address run back icing. If needed for specific applications, the position of probe 228 can be shifted forward or aft along the chord, as indicated by the double headed arrow in FIG. 6, to change the pressure distribution and/or improve DHE, and the diameters of the bleed passages 218 and outlets 216 can be increased and/or chamfered on the low pressure side of airfoil body 202. It should be noted that in some configurations the edge 250 of the inlet leading to probe 228 can be key to performance, and care should be used in its design and manufacture. It is contemplated that the ratio between an inlet, e.g. inlet 112 or 312, on the high pressure side and outlets, e.g. outlets 116 or 216, on the low pressure side can be adjusted for performance customization. For example, an inlet, e.g. inlet 112 or 312, and outlet, e.g. outlet 116 and 216, with nearly equal flow areas will tend to lead to better response time but there may be a trade-off of poorer recovery error. On the other hand, an inlet with a larger flow area than the outlet will tend to provide better recovery error but there may be a trade-off of poorer response time.

Figure 7:
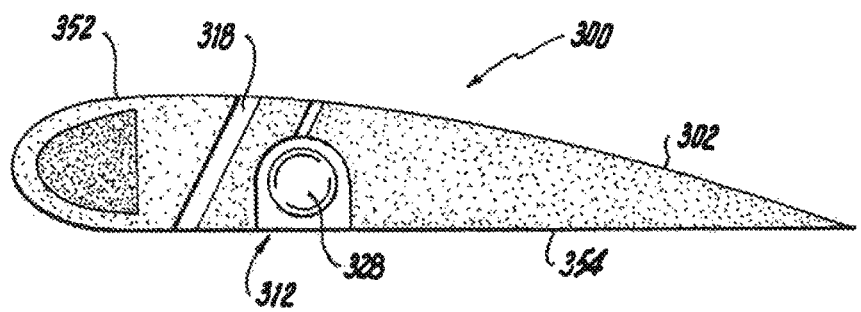
FIG. 7 is a schematic end view of another exemplary embodiment of a total air temperature sensor constructed in accordance with the present disclosure, showing a slit dividing a thermally conductive airfoil portion with a heater therein from a thermally resistive airfoil portion for reducing deicing heater error (DHE).

With reference now to FIG. 7, another exemplary embodiment of a total air temperature sensor 300 is described. Sensor 300 includes a bleed slot 318 in lieu of multiple bleed passages. Bleed slot 318 is co-extensive in the longitudinal direction with inlet 312, see, e.g., inlet 112 shown in FIG. 2, to bleed the heated boundary layer off of the high pressure side of airfoil body 302 upstream of inlet 312. The portion 352 of airfoil body 302 forward of slit 318 is made of a relatively high thermal conductivity material, and the portion 354 of airfoil body 302 downstream of slit 318 is made of a relatively low thermal conductivity material. This allows for a high degree of anti-icing over the leading portion 352 of airfoil body 302 where it is needed, and reduces the DHE by shielding probe 328 from the de-icing heat.

Those skilled in the art will readily appreciate that total air temperature sensors, e.g. total air temperature sensors 100, 200 or 300, are configured to reduce the aerodynamic wake trailing from the sensor, therein reducing noise emitted by engine fan blades hitting the wake.

While shown and described in the exemplary context of air flow, those skilled in the art will readily appreciate that total air temperature measurements are exemplary only. Similar measurements can be made for any other suitable fluid using the techniques described herein without departing from the scope of this disclosure.

The methods and systems of the present disclosure, as described above and shown in the drawings, provide for total air temperature sensors with superior properties including improved time response at elevated Mach numbers and improved DHE relative to traditional sensors. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A total air temperature sensor comprising:
    an airfoil body extending from an airfoil base to an opposed airfoil tip along a longitudinal axis and defining a leading edge and opposed trailing edge, wherein the airfoil body defines a high pressure surface and an opposed low pressure surface each extending longitudinally from the airfoil base to the airfoil tip, wherein the airfoil body defines an interior flow passage with an inlet for fluid communication of fluid into the interior flow passage and an outlet for exhausting fluid out from the interior flow passage, and wherein the airfoil body defines a plurality of bleed passages through the airfoil body between the leading edge and the interior flow passage, wherein each bleed passage has an inlet in the high pressure surface and an outlet in the low pressure surface; and
    a temperature probe mounted within the interior flow passage for measuring temperature of flow through the interior flow passage to determine total air temperature.

2. A total air temperature sensor as recited in claim 1, wherein the inlet of the interior flow passage defines an elongate aperture extending axially along an exterior longitudinal surface of the airfoil body.

3. A total air temperature sensor as recited in claim 1, wherein the outlet of the interior flow passage defines an elongate aperture extending axially along an exterior longitudinal surface of the airfoil body.

4. A total air temperature sensor as recited in claim 1, wherein at least one of the bleed passages is cylindrical.

5. A total air temperature sensor as recited in claim 1, further comprising a heater disposed upstream of the bleed passage for discouraging ice buildup on the airfoil body.

6. A total air temperature sensor as recited in claim 1, further comprising a radiation shield disposed partially about the temperature probe within the interior flow passage for inhibiting radiative heat exchange between the airfoil body and the temperature probe.

7. A total air temperature sensor as recited in claim 1, wherein the airfoil body defines a supercritical airfoil with a characteristic normal shock location downstream of the inlet and outlet of the interior flow passage.

8. A total air temperature sensor as recited in claim 1, wherein each of the high and low pressure surfaces extends downstream from the leading edge to the trailing edge of the airfoil body, and wherein the inlet of the interior flow passage is defined in the high pressure surface.

9. A total air temperature sensor as recited in claim 8, wherein the inlet of each bleed passage defined in the high pressure surface between the leading edge and the inlet of the interior flow passage.

10. A total air temperature sensor as recited in claim 8, wherein the outlet of the interior flow passage is defined in the low pressure surface.

11. A total air temperature sensor as recited in claim 10, wherein the outlet of each bleed passage is defined in the low pressure surface between the leading edge and the outlet of the interior flow passage.

12. A total air temperature sensor comprising:
an airfoil body extending from an airfoil base to an opposed airfoil tip along a longitudinal axis and defining a leading edge and opposed trailing edge, wherein the airfoil body defines a high pressure surface and an opposed low pressure surface each extending longitudinally from the airfoil base to the airfoil tip, wherein the airfoil body defines an interior flow passage with an inlet for fluid communication of fluid into the interior flow passage and a plurality of outlets for exhausting fluid out from the interior flow passage, and wherein the airfoil body defines a plurality of bleed passages through the airfoil body between the leading edge and the interior flow passage, wherein each bleed passage has an inlet in the high pressure surface and an outlet in the low pressure surface; and
a temperature probe mounted within the interior flow passage for measuring temperature of flow through the interior flow passage to determine total air temperature.

13. A total air temperature sensor as recited in claim 12, wherein the inlet of the interior flow passage defines an elongate aperture extending axially along an exterior longitudinal surface of the airfoil body, and wherein each bleed passage is cylindrical.

14. A total air temperature sensor as recited in claim 12, further comprising:
a heater disposed upstream of the bleed passage for discouraging ice buildup on the airfoil body; and
a radiation shield disposed partially about the temperature probe within the interior flow passage for inhibiting radiative heat exchange between the airfoil body and the temperature probe.

15. A total air temperature sensor comprising:
an airfoil body extending from an airfoil base to an opposed airfoil tip along a longitudinal axis and defining a leading edge and opposed trailing edge, wherein the airfoil body defines an interior flow passage with an inlet for fluid communication of fluid into the interior flow passage and a plurality of outlets for exhausting fluid out from the interior flow passage, and wherein the airfoil body defines a plurality of bleed passages through the airfoil body between the leading edge and the interior flow passage, wherein the airfoil body defines a high pressure surface and an opposed low pressure surface each extending longitudinally from the airfoil base to the airfoil tip, wherein each of the high and low pressure surfaces extends downstream from the leading edge to the trailing edge of the airfoil body, wherein the inlet of the interior flow passage is defined in the high pressure surface, wherein each bleed passage has an inlet in the high pressure surface between the leading edge and the inlet of the interior flow passage, wherein the outlets of the interior flow passage are defined in the low pressure surface, and wherein the bleed passages each have a respective outlet in the low pressure surface between the leading edge and the outlets of the interior flow passage; and
a temperature probe mounted within the interior flow passage for measuring temperature of flow through the interior flow passage to determine total air temperature.

* * * * *